United States Patent
Lee et al.

(10) Patent No.: US 9,160,556 B2
(45) Date of Patent: Oct. 13, 2015

(54) METHOD AND APPARATUS FOR PROVIDING REMOTE USER INTERFACE SERVICE

(75) Inventors: Kwang-kee Lee, Seoul (KR); Glenn A. Adams, Cambridge, MA (US); Sung-wook Byun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1042 days.

(21) Appl. No.: 12/706,061

(22) Filed: Feb. 16, 2010

(65) Prior Publication Data

US 2010/0211883 A1 Aug. 19, 2010

Related U.S. Application Data

(60) Provisional application No. 61/152,321, filed on Feb. 13, 2009.

(30) Foreign Application Priority Data

Dec. 30, 2009 (KR) .................. 10-2009-0134930

(51) Int. Cl.
*G06F 3/0481* (2013.01)
*G06F 9/44* (2006.01)
(Continued)

(52) U.S. Cl.
CPC ............ *H04L 12/282* (2013.01); *G06F 9/4443* (2013.01); *G06F 9/4445* (2013.01)

(58) Field of Classification Search
CPC ....... G06T 11/60; G06T 15/005; G06T 19/00; H04L 29/06; H04L 29/08072; G06F 1/163; G06F 3/0481; G06F 9/4443; G06F 17/22; G06F 17/2247; G06F 17/3089; G06F 17/300011
USPC .................. 345/418, 619, 501, 522; 719/328; 715/740, 200, 234, 700, 733, 760, 762, 715/763; 709/203, 201, 217, 219, 231
See application file for complete search history.

(56) References Cited

U.S. PATENT DOCUMENTS 5,300,930 A 4/1994 Burger et al.
6,963,925 B1* 11/2005 Ishikawa et al. .............. 709/238
(Continued)

FOREIGN PATENT DOCUMENTS

CN 1945578 A 4/2007
CN 101071380 A 11/2007
(Continued)

OTHER PUBLICATIONS

Ferraiolo et al. "Scalable vector graphics (SVG) 1.1 specification." World Wide Web Consortium (W3C). (Jan. 14, 2003).*
(Continued)

*Primary Examiner* — Ke Xiao
*Assistant Examiner* — Jed-Justin Imperial
(74) *Attorney, Agent, or Firm* — Sughrue Mion, PLLC

(57) ABSTRACT

Provided is a method of providing a remote user interface (UI) service of a remote UI client device. The method includes: receiving optimized scalable vector graphics (OSVG) information encoded so as to represent graphics including contents and a UI from a remote UI server device; decoding the encoded OSVG information; and rendering the decoded OSVG information using an OSVG primitive application programming interface (API).

18 Claims, 3 Drawing Sheets

(51) Int. Cl.
*G06T 1/20* (2006.01)
*G06T 15/00* (2011.01)
*H04L 12/28* (2006.01)

(56) References Cited

U.S. PATENT DOCUMENTS

| | | | |
|---|---|---|---|
| 8,432,410 B1* | 4/2013 | Kilgard | 345/581 |
| 2004/0261041 A1 | 12/2004 | Parakkuth et al. | |
| 2005/0267972 A1* | 12/2005 | Costa-Requena et al. | 709/227 |
| 2006/0176207 A1 | 8/2006 | Elixmann et al. | |
| 2007/0143664 A1 | 6/2007 | Fang et al. | |
| 2007/0192441 A1 | 8/2007 | Jin et al. | |
| 2008/0034029 A1 | 2/2008 | Fang et al. | |
| 2008/0052347 A1 | 2/2008 | Jung et al. | |
| 2008/0201695 A1 | 8/2008 | Zhou | |
| 2008/0222504 A1* | 9/2008 | Chitturi | 715/201 |
| 2009/0083315 A1* | 3/2009 | Ishizaki et al. | 707/103 R |

FOREIGN PATENT DOCUMENTS

| | | |
|---|---|---|
| CN | 101346689 A | 1/2009 |
| EP | 0 484 259 A1 | 5/1992 |
| KR | 10-2005-0104397 A | 11/2005 |
| KR | 10-0739795 B1 | 7/2007 |
| KR | 10-0801004 B1 | 1/2008 |
| WO | 03/058575 A1 | 7/2003 |
| WO | 2004/109554 A1 | 12/2004 |

OTHER PUBLICATIONS

International Search Report dated Sep. 30, 2010, issued in corresponding PCT Application No. PCT/KR2010/000898.
Communication dated Sep. 2, 2013, issued by the State Intellectual Property Office of the People's Republic of China in corresponding Application No. 201080016470.7.
Communication dated Dec. 2, 2013, issued by the European Patent Office in counterpart European Application No. 10741410.4.
Communication dated May 5, 2014, issued by the State Intellectual Property Office of the People's Republic of China in counterpart Chinese Application No. 2010800164707.
Communication dated Oct. 28, 2014, issued by the State Intellectual Property Office of the People's Republic of China in counterpart Chinese Application No. 201080016470.7.

* cited by examiner

METHOD AND APPARATUS FOR PROVIDING REMOTE USER INTERFACE SERVICE

CROSS-REFERENCE TO RELATED PATENT APPLICATION

This application claims the benefit of Korean Patent Application No. 10-2009-0134930, filed on Dec. 30, 2009, in the Korean Intellectual Property Office, and U.S. Provisional Application No. 61/152,321, filed on Feb. 13, 2009, in the USPTO, the disclosures of which are incorporated herein in their entirety by reference.

BACKGROUND OF THE INVENTION

1. Field of the Invention

The present invention relates to a method and apparatus for providing a remote user interface (UI) service, and more particularly, to a method and apparatus for providing a remote UI service in which a remote UI client device that received encoded optimized scalable vector graphics (OSVG) information from a remote UI server device renders graphics represented by the OSVG information by using OSVG primitive application programming interfaces (API).

2. Description of the Related Art

A server executes various applications providing contents and requiring a user interface (UI) to a client device. The server represents graphics including contents and a UI as bitmap graphics or vector graphics.

As networks have recently advanced, there are demands for various client devices such as a television (TV), a mobile device, etc., connected to a server through a network to receive graphics including contents and a UI from the server and to control applications executed in the server through various input/output interfaces of the client devices.

In this instance, a client device has various specifications in terms of resolution, memory capacity, and network bandwidth, etc., and thus it is necessary to consider the environments of the client device.

SUMMARY OF THE INVENTION

The present invention provides a method and apparatus for providing a remote UI service in which a remote UI client device that received encoded optimized scalable vector graphics (OSVG) information from a remote UI server device renders graphics represented by the OSVG information by using OSVG primitive application programming interfaces (API).

The present invention also provides a computer readable recording medium having embodied thereon a computer program for executing the method.

According to an aspect of the present invention, there is provided a method of providing a remote UI service of a remote user interface (UI) client device, the method including: receiving optimized scalable vector graphics (OSVG) information encoded so as to represent graphics including contents and a UI from a remote UI server device; decoding the encoded OSVG information; and rendering the decoded OSVG information using an OSVG primitive application programming interface (API).

The encoded OSVG information is information that text-based OSVG information is binary-encoded, and also is information that only semantic information representing a changed state is encoded when the remote UI server device renews graphics.

The decoding of the encoded OSVG information includes decoding the encoded OSVG information to the text-based OSVG information, and parsing each OSVG primitive API.

The OSVG primitive API includes at least one from among the group consisting of Define Viewport, Define Transform, Define Color, Define Gradient, Define Path, Define Image, Define Font, Define Group, Define Animation, Push Transform, Pop Transform, Stroke Path, Fill Path, Draw Image, Draw Glyphs, Draw Text, Draw Group, and Animate.

The OSVG primitive API includes at least one from among from among the group consisting of Query Screen, Query Viewport, Query Font Metrics, Query Glyph Metrics, Query Memory, Query Instrumentation, Define Event, Reserve Event, Release Event, Remove Definition, and Capture Raster.

The method further includes generating an input event for controlling an application executed in the remote UI server device on the basis of an external input; encoding the input event using a value defined in a predetermined protocol; and transmitting the encoded input event to the remote UI server device.

According to another aspect of the present invention, there is provided a method of providing a remote UI service of a remote UI server device, the method including: executing an application providing contents and requiring a UI; encoding graphics including the contents and the UI to OSVG information; and transmitting the encoded OSVG information to a remote UI client device.

The application is implemented using local APIs including JAVA abstract window toolkit (AWT) APIs and home audio/video interoperability (HAVI) APIs, and the encoding of the graphics is executed using APIs encoding to OSVG information.

The method further includes mapping the local APIs to the OSVG encoding APIs.

The encoded OSVG information is information that text-based OSVG information is binary-encoded, and also is information that only semantic information representing a changed state is encoded when the remote UI server device renews graphics.

The method further includes: receiving from the remote UI client device an encoded input event for controlling the application; decoding the input event to a value defined in the application; and executing the application so as to control the application using the decoded input event.

According to another aspect of the present invention, there is provided a computer readable recording medium having embodied thereon a computer program for executing the method.

According to another aspect of the present invention, there is provided a remote UI client device including: an OSVG information receiving unit for receiving OSVG information encoded so as to represent graphics including contents and a UI from a remote UI server device; an OSVG information decoding unit for decoding the encoded OSVG information; and a rendering unit for rendering the decoded OSVG information using an OSVG primitive API.

According to another aspect of the present invention, there is provided a remote UI server device including: an application executing unit executing an application for providing contents and requiring a UI; an OSVG information encoding unit encoding graphics including the contents and the UI to OSVG information; and an OSVG information transmitting unit transmitting the encoded OSVG information to a remote UI client device.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
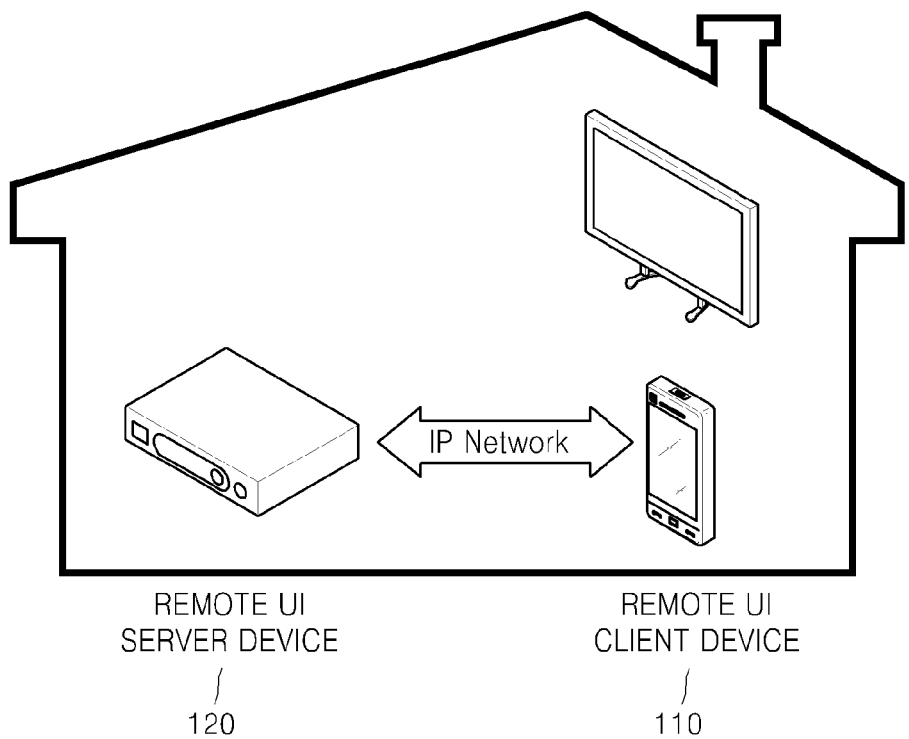
FIG. 1 is a schematic view illustrating a method of providing a remote UI service according to an embodiment of the present invention.

The present general inventive concept will now be described more fully with reference to the accompanying drawings, in which exemplary embodiments of the present general inventive concept are shown. In the drawings, like reference numerals denote like elements, and the sizes and thicknesses of elements may be exaggerated for clarity.

FIG. 1 is a schematic view illustrating a method of providing a remote user interface (UI) service, according to an embodiment of the present invention;

A remote UI server device 120 is a network-based device executing various applications providing contents and requiring a UI. The remote UI server device 120 includes various consumer electronics (CE) devices such as a set-top box, or the like. The applications executed in the remote UI server device 120 may be implemented using local application programming interfaces (APIs) including JAVA abstract window toolkit (AWT) APIs and home audio/video interoperability (HAVI) APIs. However, one of ordinary skill in the art would understand that various other implementations are possible.

A remote UI client device 110 is a network-based device including various input/output interfaces and includes a TV and mobile devices.

The remote UI server device 120 encodes graphics including contents and a UI to optimized scalable vector graphics (OSVG) information and provides the encoded OSVG information to the remote UI client device 110 remotely through a network.

The remote UI server device 120 maps application local APIs to OSVG-based graphic encoding APIs, executes an OSVG encoding independently on the application local APIs, and then transmits the encoded OSVG information to the remote UI client device 110.

A scalable vector graphics (SVG), which is a language based on extensible markup language (XML) to represent two-dimensional graphics, is an XML graphics standard proposed by the world wide web consortium (W3C). The SVG allows three types of graphic objects including images, text, and vector graphic shapes.

The OSVG information is information represented by optimizing SVG information. The OSVG information optimizes the SVG information by binary-encoding the SVG information and encoding only semantic information representing a changed state in order to represent renewed graphics.

The remote UI client device 110 decodes the encoded OSVG information received from the remote UI server device 120, and then renders the graphics represented by the OSVG information by using an OSVG primitive API.

The remote UI client device 110 receives various control commands, text, etc., from a user, encodes them, and then transmits the encoded input event to the remote UI server device 120. The remote UI server device 120 decodes the input event, provides the input event to an application requiring the input event, and then executes the application.

According to the current embodiment, the remote UI server device 120 represents graphics as OSVG information, not as a bitmap graphic, and provides the graphics to the remote UI client device 110, so that a remote UI service, which is extensible and may maintain the quality of the graphics, may be provided to the remote UI client device 110 having various specifications in terms of resolution, memory capacity, network bandwidth, and the like.

Furthermore, according to the current embodiment, the remote UI server device 120 binary-encodes text-based SVG information, and transmits OSVG information that only semantic information representing a changed state to represent the renewed graphics is encoded to the remote UI client device 110, so that the amount of the transmitted graphic information and a transmission time may be minimized, and consequently, a UI performance may be increased.

Furthermore, according to the current embodiment, even when the kinds of input/output interfaces of the remote UI server device 120 are limited, user-friendliness in that applications executed in the remote UI server device 120 may be controlled through various input/output interfaces of the remote UI client device 110 is provided.

Furthermore, according to the current embodiment, the remote UI server device 120 implements various applications providing contents and requiring a UI independently with standardized or non-standardized remote UI service platform in a method of providing a subordinate remote UI service, so that requirements of a standardized application implementation environment (for example, OpenCable Application Platform: OCAP) may be satisfied, and a remote UI service may be provided to the remote UI client device 110, as well.

Figure 2:
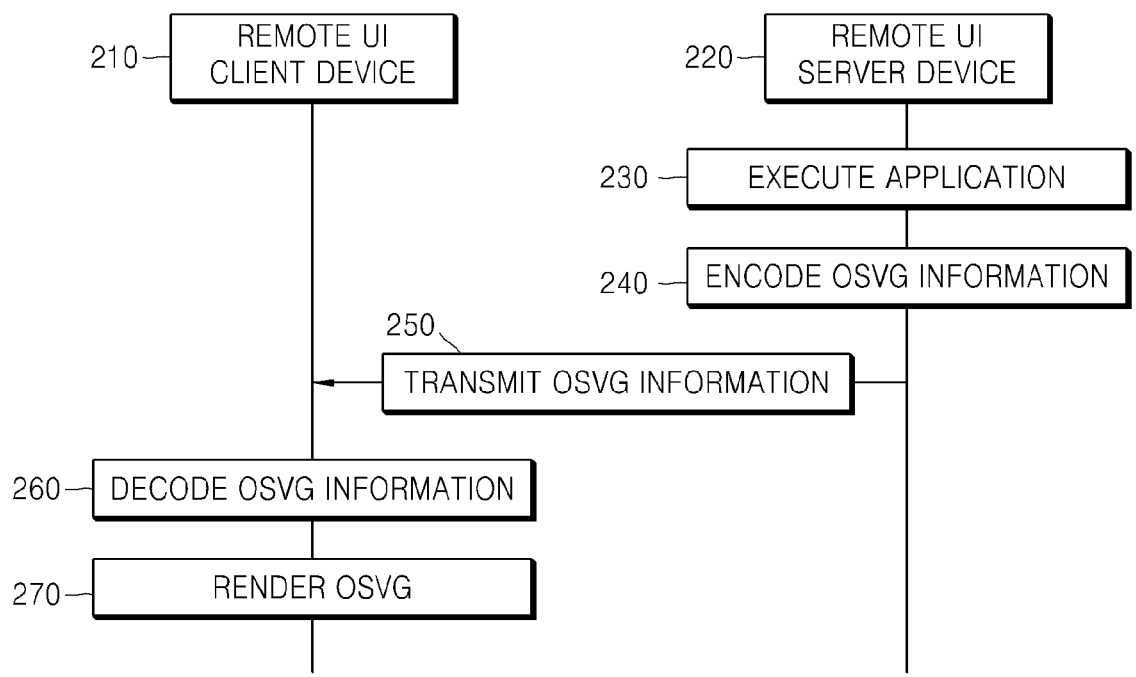
FIG. 2 is a flowchart illustrating a process for providing an OSVG-based remote UI service, according to an embodiment of the present invention.

FIG. 2 is a flowchart illustrating a process for providing an OSVG-based remote UI service, according to an embodiment of the present invention.

In operation 230, a remote UI server device 220 executes an application providing contents and requiring a UI. The application may be implemented using local APIs including JAVA AWT APIs and HAVI APIs. However, one of ordinary skill in the art would understand that other implementations are possible.

In operation 240, the remote UI server device 220 encodes graphics including contents and a UI to OSVG information. The remote UI server device 220 encodes the graphics to the OSVG information using APIs encoding to OSVG information. The remote UI server device 220 maps application local APIs to OSVG encoding APIs, and then executes an OSVG encoding independently on the application local APIs.

The encoded OSVG information is information that text-based OSVG information is binary-encoded. The encoded OSVG information is also information that only semantic information representing a changed state is encoded, when the remote UI server device 220 renews graphics.

In operation 250, the remote UI server device 220 transmits the encoded OSVG information to a remote UI client device 210.

In operation 260, the remote UI client device 210 decodes the received encoded OSVG information. The remote UI client device 210 decodes the encoded OSVG information to text-based OSVG information and parses each OSVG primitive API.

In operation 270, the remote UI client device 210 renders the decoded OSVG information using an OSVG primitive API.

The OSVG primitive API includes at least one from among the group consisting of "Define Viewport", "Define Transform", "Define Color", "Define Gradient", "Define Path", "Define Image", "Define Font", "Define Group", "Define Animation", "Push Transform", "Pop Transform", "Stroke Path", "Fill Path", "Draw Image", "Draw Glyphs", "Draw Text", "Draw Group", and "Animate".

The "Define Viewport" defines an area where graphics are to be rendered in a coordinate space. The "Define Transform" defines an affine transformation that converts a coordinate in a two-dimensional coordinate space. The "Define Color" defines a color. The "Define Gradient" defines a gradient that exhibits a gradual color effect.

The "Define Path" defines an arbitrary shape representing an outline in successive dots. The "Define Image" defines a two-dimensional raster image, for example, a joint photographic coding experts group (JPEG) image. The "Define Font" defines a font.

The "Define Group" defines a group consisting of a Path, an Image, and a Font. The "Define Animation" defines an animation in which contents of a vector graphic vary according to time.

The "Push Transform" executes a conversion requirement. The "Pop Transform" executes a conversion withdrawal. The "Stroke Path" draws an outline. The "Fill Path" fills an arbitrary shape represented in an outline. The "Draw Image" renders a two-dimensional raster image. The "Draw Glyphs" renders a font of an outline. The "Draw Text" renders a series of glyphs consisting of at least one font. The "Draw Group" renders a group consisting of a Path, an Image, and a Font. The "Animate" renders contents of a vector graphic that varies according to time.

The OSVG primitive API further includes at least one from among the group consisting of "Query Screen", "Query Viewport", "Query Font Metrics", "Query Glyph Metrics", "Query Memory", "Query Instrumentation", "Define Event", "Reserve Event", "Release Event", "Remove Definition", and "Capture Raster".

The "Query Screen" inquires about a screen that is a basic coordinate space where graphics are to be rendered. The "Query Viewport" inquires about an area where graphics are to be rendered in a coordinate space.

The "Query Font Metrics" inquires about properties of a font. The "Query Glyph Metrics" inquires about properties of an outline font. The "Query Memory" inquires about properties of a memory. The "Query Instrumentation" inquires about a graphic tool. The "Define Event" defines an event. The "Reserve Event" registers an event. The "Release Event" cancels the registration of the event. The "Remove Definition" cancels definitions about various graphic objects and graphic formats. The "Capture Raster" captures a two-dimensional raster image.

Figure 3:
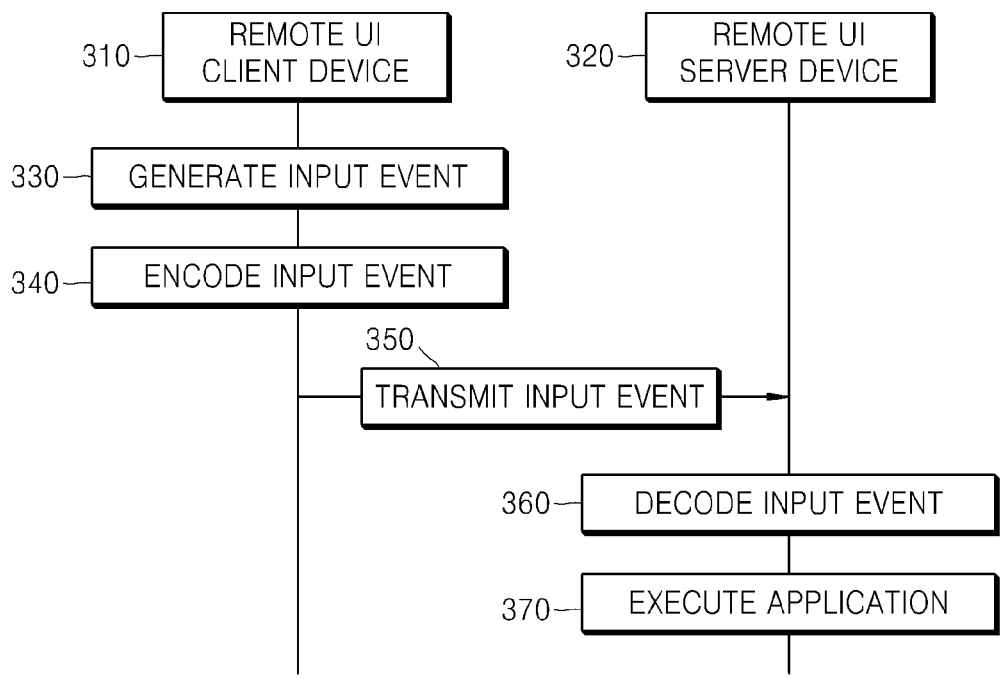
FIG. 3 is a flowchart illustrating a process for processing an input event, according to an embodiment of the present invention.

FIG. 3 is a flowchart illustrating a process for processing an input event, according to an embodiment of the present invention.

In operation 330, a remote UI client device 310 generates an input event for controlling an application executed in a remote UI server device 320 on the basis of an external input.

In operation 340, the remote UI client device 310 encodes the input event using a value defined in a predetermined protocol. The predetermined protocol includes a universal plug and play (UPnP) RemoteUI standard and a consumer electronics association (CEA) 2014 standard. However, one of ordinary skill in the art would understand that other protocols for encoding the input event may be applied.

In operation 350, the remote UI client device 310 transmits the encoded input event to the remote UI server device 320.

In operation 360, the remote UI server device 320 decodes the received encoded input event to a value defined in the application.

In operation 370, the remote UI server device 320 executes the application to control the application using the decoded input event.

Figure 4:
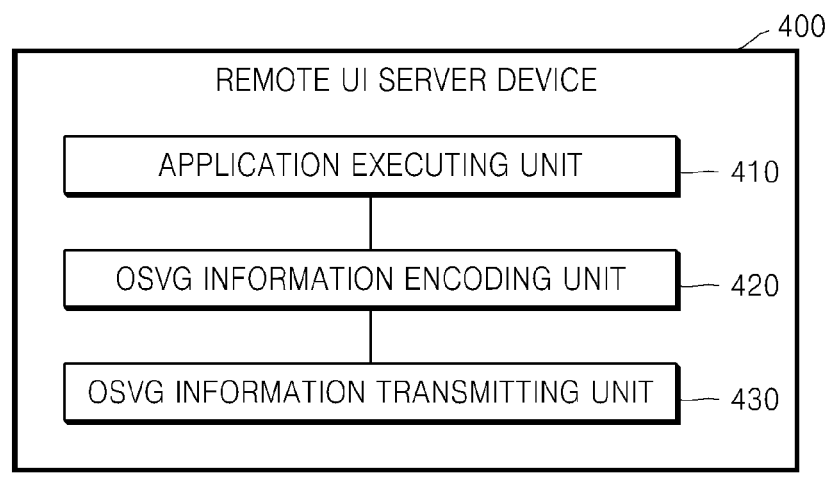
FIG. 4 is a block diagram illustrating a structure of a remote UI server device according to an embodiment of the present invention.

FIG. 4 is a block diagram illustrating a structure of a remote UI server device 400 according to an embodiment of the present invention.

The remote UI server device 400 includes an application executing unit 410, an OSVG information encoding unit 420, and an OSVG information transmitting unit 430.

The application executing unit 410 executes an application providing contents and requiring a UI. The application is implemented using local APIs including JAVA AWT APIs and HAVI APIs.

The remote UI server device 400 may further include an API mapping unit (not shown) that maps application local APIs to OSVG encoding APIs.

The OSVG information encoding unit 420 encodes graphics including contents and a UI to OSVG information using APIs encoding to the OSVG information mapped by the API mapping unit.

The encoded OSVG information is information that text-based OSVG information is binary-encoded. The encoded OSVG information is also information that only semantic information representing a changed state is encoded, when the remote UI server device 400 renews graphics The OSVG information transmitting unit 430 transmits the encoded OSVG information to a remote UI client device 500.

The remote UI server device 400 further includes an input event receiving unit (not shown) and an input event decoding unit (not shown).

The input event receiving unit receives from the remote UI client device 500 an encoded input event for controlling an application.

The input event decoding unit decodes the input event to a value defined in the application.

The application executing unit 410 executes the application to control the application using the decoded input event.

Figure 5:
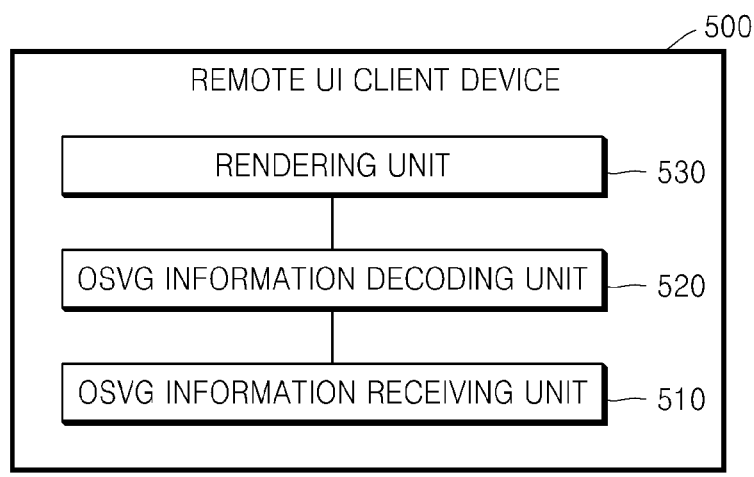
FIG. 5 is a block diagram illustrating a structure of a remote UI client device according to an embodiment of the present invention.

FIG. 5 is a block diagram illustrating a structure of the remote UI client device 500 according to an embodiment of the present invention.

The remote UI client device 500 includes an OSVG information receiving unit 510, an OSVG information decoding unit 520, and a rendering unit 530.

The OSVG information receiving unit 510 receives OSVG information encoded so as to represent graphics including contents and a UI from the remote UI server device 400.

The OSVG information decoding unit 520 decodes the encoded OSVG information. The OSVG information decoding unit 520 decodes the encoded OSVG information to text-based OSVG information and parses each OSVG primitive API.

The rendering unit 530 renders the decoded OSVG information using an OSVG primitive API.

The OSVG primitive API includes at least one from among the group consisting of "Define Viewport", "Define Transform", "Define Color", "Define Gradient", "Define Path", "Define Image", "Define Font", "Define Group", "Define Animation", "Push Transform", "Pop Transform", "Stroke Path", "Fill Path", "Draw Image", "Draw Glyphs", "Draw Text", "Draw Group", and "Animate".

The OSVG primitive API further includes at least one from among the group consisting of "Query Screen", "Query Viewport", "Query Font Metrics", "Query Glyph Metrics", "Query Memory", "Query Instrumentation", "Define Event", "Reserve Event", "Release Event", "Remove Definition", and "Capture Raster".

The remote UI client device 500 further includes an input event generating unit (not shown), an input event encoding unit (not shown), and an input event transmitting unit (not shown).

The input event generating unit generates an input event for controlling the application executed in the remote UI server device 400 on the basis of an external input.

The input event encoding unit encodes the input event using a value defined in a predetermined protocol. The predetermined protocol includes a UPnP Remote UI standard and a CEA 2014 standard. However, one of ordinary skill in the art would understand that other protocols for encoding an input event may be applied.

The input event transmitting unit transmits the encoded input event to the remote UI server device 400.

While the present invention has been particularly shown and described with reference to exemplary embodiments thereof, it will be understood by one of ordinary skill in the art that various changes in form and details may be made therein without departing from the spirit and scope of the present invention as defined by the following claims.

For example, the remote UI server device 400 and the remote UI client device 500 according to exemplary embodiments of the present invention may include a bus coupled to units of each device illustrated in FIGS. 4 and 5, at least one processor coupled to the bus, and a memory that is coupled to the bus to store a command, a received message, or a generated message and is coupled to the at least one processor for executing the commands.

The invention can be also embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

What is claimed is:

1. A method of providing a remote user interface (UI) service of a remote UI client device, the method comprising:
   receiving optimized scalable vector graphics (OSVG) information encoded to represent parameterized graphics comprising contents and a UI from a remote UI server device;
   decoding the encoded OSVG information; and
   rendering the decoded OSVG information using an OSVG primitive application programming interface (API),
   wherein the encoded OSVG information is binary-encoded information in which only semantic information representing parameterized graphics corresponding to a changed state in response to renewal of graphics by the remote UI server device is encoded,
   wherein local APIs are mapped to OSVG encoding APIs using an API mapping unit of the remote UI server device to transmit the binary-encoded OSVG information to the remote UI client device so that the OSVG encoding APIs render the same graphic which is rendered by the local APIs,
   wherein the remote UI server device executes an OSVG encoding independently on the local APIs.

2. The method of claim 1, wherein the decoding of the encoded OSVG information comprises decoding the encoded OSVG information to text-based OSVG information, and parsing each OSVG primitive API.

3. The method of claim 1, wherein the OSVG primitive API comprises at least one from among the group consisting of Define Viewport, Define Transform, Define Color, Define Gradient, Define Path, Define Image, Define Font, Define Group, Define Animation, Push Transform, Pop Transform, Stroke Path, Fill Path, Draw Image, Draw Glyphs, Draw Text, Draw Group, and Animate.

4. The method of claim 1, wherein the OSVG primitive API comprises at least one from among the group consisting of Query Screen, Query Viewport, Query Font Metrics, Query Glyph Metrics, Query Memory, Query Instrumentation, Define Event, Reserve Event, Release Event, Remove Definition, and Capture Raster.

5. The method of claim 1, further comprising:
   generating an input event for controlling an application executed in the remote UI server device on the basis of an external input;
   encoding the input event using a value defined in a predetermined protocol; and
   transmitting the encoded input event to the remote UI server device.

6. A non-transitory computer readable recording medium having embodied thereon a computer program for executing the method of claim 1.

7. A method of providing a remote UI service of a remote UI server device, the method comprising:
   executing an application providing contents and requiring a UI;
   parameterizing graphics comprising the contents and the UI in the remote UI server device;
   mapping local APIs to OSVG encoding APIs using an API mapping unit of the remote UI server device;
   encoding the parameterized graphics comprising the contents and the UI to OSVG information using the OSVG encoding APIs; and
   transmitting the encoded OSVG information to a remote UI client device,
   wherein the encoded OSVG information is binary-encoded information in which only semantic information representing parameterized graphics corresponding to a changed state in response to renewal of graphics by the remote UI server device is encoded,
   wherein the mapping is performed such that the binary-encoded OSVG information is transmitted to the remote UI client device so that the OSVG encoding APIs render the same graphic which is rendered by the local APIs,
   wherein the encoding the parameterized graphics comprises executing an OSVG encoding independently on the local APIs mapped to the OSVG encoding APIs.

8. The method of claim 7, wherein the application is implemented using local APIs comprising JAVA abstract window toolkit (AWT) APIs and home audio/video interoperability (HAVI) APIs.

9. The method of claim 7, further comprising:
   receiving from the remote UI client device an encoded input event for controlling the application;
   decoding the input event to a value defined in the application; and executing the application to control the application using the decoded input event.

10. A non-transitory computer readable recording medium having embodied thereon a computer program for executing the method of claim 7.

11. A remote UI client device comprising:
an OSVG information receiving unit configured to receive OSVG information encoded to represent parameterized graphics comprising contents and a UI from a remote UI server device;
an OSVG information decoding unit configured to decode the encoded OSVG information; and
a rendering unit configured to render the decoded OSVG information using an OSVG primitive API,
wherein the encoded OSVG information is binary-encoded information in which only semantic information representing parameterized graphics corresponding to a changed state in response to renewal of graphics by the remote UI server device is encoded,
wherein local APIs are mapped to OSVG encoding APIs using an API mapping unit of the remote UI server device to transmit the binary-encoded OSVG information to the remote UI client device so that the OSVG encoding APIs render the same graphic which is rendered by the local APIs,
wherein the remote UI server device executes an OSVG encoding independently on the local APIs mapped to the OSVG encoding APIs.

12. The remote UI client device of claim 11, wherein the OSVG information decoding unit decodes the encoded OSVG information to text-based OSVG information and parses each OSVG primitive API.

13. The remote UI client device of claim 11, wherein the OSVG primitive API comprises at least one from among the group consisting of Define Viewport, Define Transform, Define Color, Define Gradient, Define Path, Define Image, Define Font, Define Group, Define Animation, Push Transform, Pop Transform, Stroke Path, Fill Path, Draw Image, Draw Glyphs, Draw Text, Draw Group, and Animate.

14. The remote UI client device of claim 11, wherein the OSVG primitive API comprises at least one from among the group consisting of Query Screen, Query Viewport, Query Font Metrics, Query Glyph Metrics, Query Memory, Query Instrumentation, Define Event, Reserve Event, Release Event, Remove Definition, and Capture Raster.

15. The remote UI client device of claim 11, further comprising:
an input event generating unit for generating an input event for controlling an application executed in the remote UI server device on the basis of an external input;
an input event encoding unit for encoding the input event using a value defined in a predetermined protocol; and
an input event transmitting unit for transmitting the encoded input event to the remote UI server device.

16. A remote UI server device comprising:
an application executing unit configured to execute an application providing contents and requiring a UI;
an OSVG information encoding unit configured to encode parameterized graphics comprising the contents and the UI to OSVG information;
an OSVG information transmitting unit configured to transmit the encoded OSVG information to a remote UI client device, and
an API mapping unit configured to map local APIs to OSVG encoding APIs to transmit the OSVG information to the remote UI client device so that the OSVG encoding APIs render the same graphic which is rendered by the local APIs;
wherein the encoded OSVG information is binary-encoded information in which only semantic information representing parameterized graphics corresponding to a changed state in response to renewal of graphics by the remote UI server device is encoded,
wherein the remote UI server device executes an OSVG encoding independently on the local APIs mapped to the OSVG encoding APIs.

17. The remote UI server device of claim 16, wherein the application is implemented using local APIs comprising JAVA AWT APIs and HAVI APIs.

18. The remote UI server device of claim 16, further comprising:
an input event receiving unit for receiving from the remote UI client device an encoded input event for controlling the application; and
an input event decoding unit for decoding the input event to a value defined in the application;
wherein the application executing unit controls the application using the decoded input event.

* * * * *